(12) United States Patent
Takahashi

(10) Patent No.: US 10,013,644 B2
(45) Date of Patent: Jul. 3, 2018

(54) STATISTICAL MAX POOLING WITH DEEP LEARNING

(71) Applicant: INTERNATIONAL BUSINESS MACHINES CORPORATION, Armonk, NY (US)

(72) Inventor: Toshihiro Takahashi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 15/346,662

(22) Filed: Nov. 8, 2016

(65) Prior Publication Data

US 2018/0129916 A1    May 10, 2018

(51) Int. Cl.
*G06K 9/66* (2006.01)
*G06T 3/20* (2006.01)
(Continued)

(52) U.S. Cl.
CPC .............. *G06K 9/66* (2013.01); *G06K 9/52* (2013.01); *G06K 9/6267* (2013.01); *G06T 3/20* (2013.01);
(Continued)

(58) Field of Classification Search
CPC .......... G06K 9/52; G06K 9/66; G06K 9/6267; G06T 3/20; G06T 2207/20021; G06T 2207/20076
See application file for complete search history.

(56) References Cited

U.S. PATENT DOCUMENTS 8,494,305 B2 * 7/2013 Porikli .................... G06T 5/002
382/225
8,682,086 B2    3/2014 Lin et al.
(Continued)

FOREIGN PATENT DOCUMENTS

WO    WO2015191652    12/2015

OTHER PUBLICATIONS

Liping, "Image Classification Algorithm Based on Sparse Coding", Journal of Multimedia, vol. 9, No. 1, Jan. 014, pp. 114-122.
(Continued)

*Primary Examiner* — Vincent Rudolph
*Assistant Examiner* — Shaghayegh Azima
(74) *Attorney, Agent, or Firm* — Tutunjian & Bitetto, P.C.; Vazken Alexanian

(57) ABSTRACT

A method is provided for image processing. The method includes receiving an image dataset having image data for a plurality of images and a group dataset having group information for each image. The method further includes transforming the image dataset into a sparse vector by applying sparse coding and using the group information. The method also includes dividing each of dimensions of the sparse vector into multiple groups with a matrix. The matrix is generated such that the matrix takes on a higher value when samples in a same group from among the multiple groups have same non-zero dimensions above a threshold amount of time and takes on a lower value compared to the higher value when the samples in the same group lack the same non-zero coefficients above the threshold amount of time. The method additionally includes transforming the sparse vector into a summation vector using the multiple groups.

20 Claims, 7 Drawing Sheets

(51) Int. Cl.
  *G06K 9/62*   (2006.01)
  *G06K 9/52*   (2006.01)
(52) U.S. Cl.
  CPC .............. *G06T 2207/20021* (2013.01); *G06T 2207/20076* (2013.01)

(56) References Cited

U.S. PATENT DOCUMENTS

| | | |
|---|---|---|
| 8,781,218 B2 | 7/2014 | Jia et al. |
| 9,697,583 B2 * | 7/2017 | Motohashi ............ G06T 3/4053 |
| 2015/0139485 A1 | 5/2015 | Bourdev |

OTHER PUBLICATIONS

Yang, et al., "Learning Hierarchical Image Representation with Sparsity, Saliency and Locality", BMVC 2011 the 22nd British Machine Vision Conference Aug. 2011, pp. 1-11.

Lee et al., "Unsupervised Learning of Hierarchical Representations with Convolutional Deep Belief Networks", Communications of the ACM, Oct. 2011, vol. 54, No. 10, pp. 95-103.

Lee et al., "Efficient Sparse Coding Algorithms", NIPS'06 Proceedings of the 19th International Conference on Neural Information Processing Systems, Dec. 2006, pp. 1-8.

* cited by examiner

STATISTICAL MAX POOLING WITH DEEP LEARNING

BACKGROUND

Technical Field

The present invention relates generally to information processing and, in particular, to statistical max pooling with deep learning.

Description of the Related Art

Deep learning technologies are becoming useful and practical in the area of image processing. Image data is high dimensional and it is difficult to interpolate several images of the same objects by only learning a dataset with answer labels. To retrieve efficient structures from images, existing structure retrieval techniques often use "max pooling" techniques. However, conventional max pooling techniques require a hand-made design for the transformation of the max pooling network and the learning data.

SUMMARY

According to an aspect of the present invention, a computer-implemented method is provided for image processing. The method includes receiving an image dataset having image data for a plurality of images and a group dataset having group information for each of the plurality of images. The method further includes transforming the image dataset into a sparse vector by applying sparse coding and using the group information. The method also includes dividing each of dimensions of the sparse vector into multiple groups with a matrix. The matrix is generated such that the matrix takes on a higher value when samples in a same group from among the multiple groups have same non-zero dimensions above a threshold amount of time and takes on a lower value compared to the higher value when the samples in the same group lack the same non-zero coefficients above the threshold amount of time. The method additionally includes transforming the sparse vector into a summation vector using the multiple groups.

According to another aspect of the present invention, a computer program product is provided for image processing. The computer program product includes a non-transitory computer readable storage medium having program instructions embodied therewith. The program instructions are executable by a computer to cause the computer to perform a method. The method includes receiving an image dataset having image data for a plurality of images and a group dataset having group information for each of the plurality of images. The method further includes transforming the image dataset into a sparse vector by applying sparse coding and using the group information. The method also includes dividing each of dimensions of the sparse vector into multiple groups with a matrix. The matrix is generated such that the matrix takes on a higher value when samples in a same group from among the multiple groups have same non-zero dimensions above a threshold amount of time and takes on a lower value compared to the higher value when the samples in the same group lack the same non-zero coefficients above the threshold amount of time. The method additionally includes transforming the sparse vector into a summation vector using the multiple groups.

According to yet another aspect of the present invention, a computing device is provided. The computing device includes a processor and a memory operably coupled to the processor. The processor and memory are configured to receive an image dataset having image data for a plurality of images and a group dataset having group information for each of the plurality of images. The processor and memory are further configured to transform the image dataset into a sparse vector by applying sparse coding and using the group information. The processor and memory are also configured to divide each of dimensions of the sparse vector into multiple groups with a matrix. The matrix is generated such that the matrix takes on a higher value when samples in a same group from among the multiple groups have same non-zero dimensions above a threshold amount of time and takes on a lower value compared to the higher value when the samples in the same group lack the same non-zero coefficients above the threshold amount of time. The processor and memory are additionally configured to transform the sparse vector into a summation vector using the multiple groups.

These and other features and advantages will become apparent from the following detailed description of illustrative embodiments thereof, which is to be read in connection with the accompanying drawings.

BRIEF DESCRIPTION OF DRAWINGS

The following description will provide details of preferred embodiments with reference to the following figures wherein.

DETAILED DESCRIPTION

The present invention is directed to statistical max pooling with deep learning.

In an embodiment, statistical max pooling with deep learning can be used to recognize the same objects across multiple images, where those objects have a small position deviation. The images can be represented in many ways including, but not limited to, a vector (e.g., of intensity values per pixel), or in a more abstract way as a set of edges, regions of a particular shape, and so forth. In an embodiment, max pooling with deep learning can partition an input image (that is, the input representation) and, for each sub-region, can output a maximum value. For example, max pooling can output a maximum value from many connected neurons.

Of course, the present invention is not limited to use with images and image recognition and can be used in other fields or areas of technology, as readily appreciated by one of ordinary skill in the art given the teachings of the present invention provided herein, while maintaining the spirit of the present invention. For example, the present invention can be used for automatic speech recognition, natural language processing, customer relationship management, anomaly detection, recommendation systems, and so forth.

Figure 1:
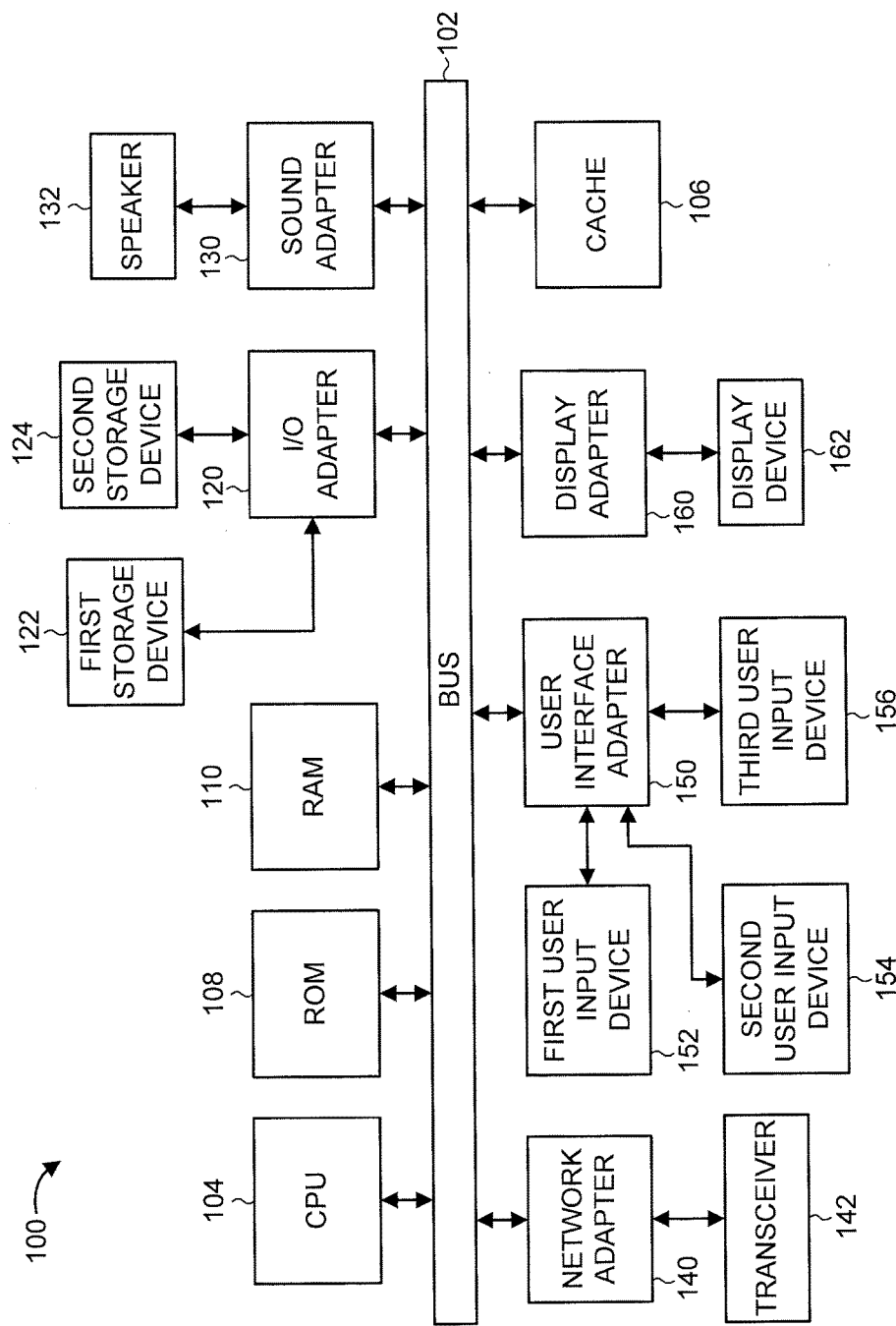
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
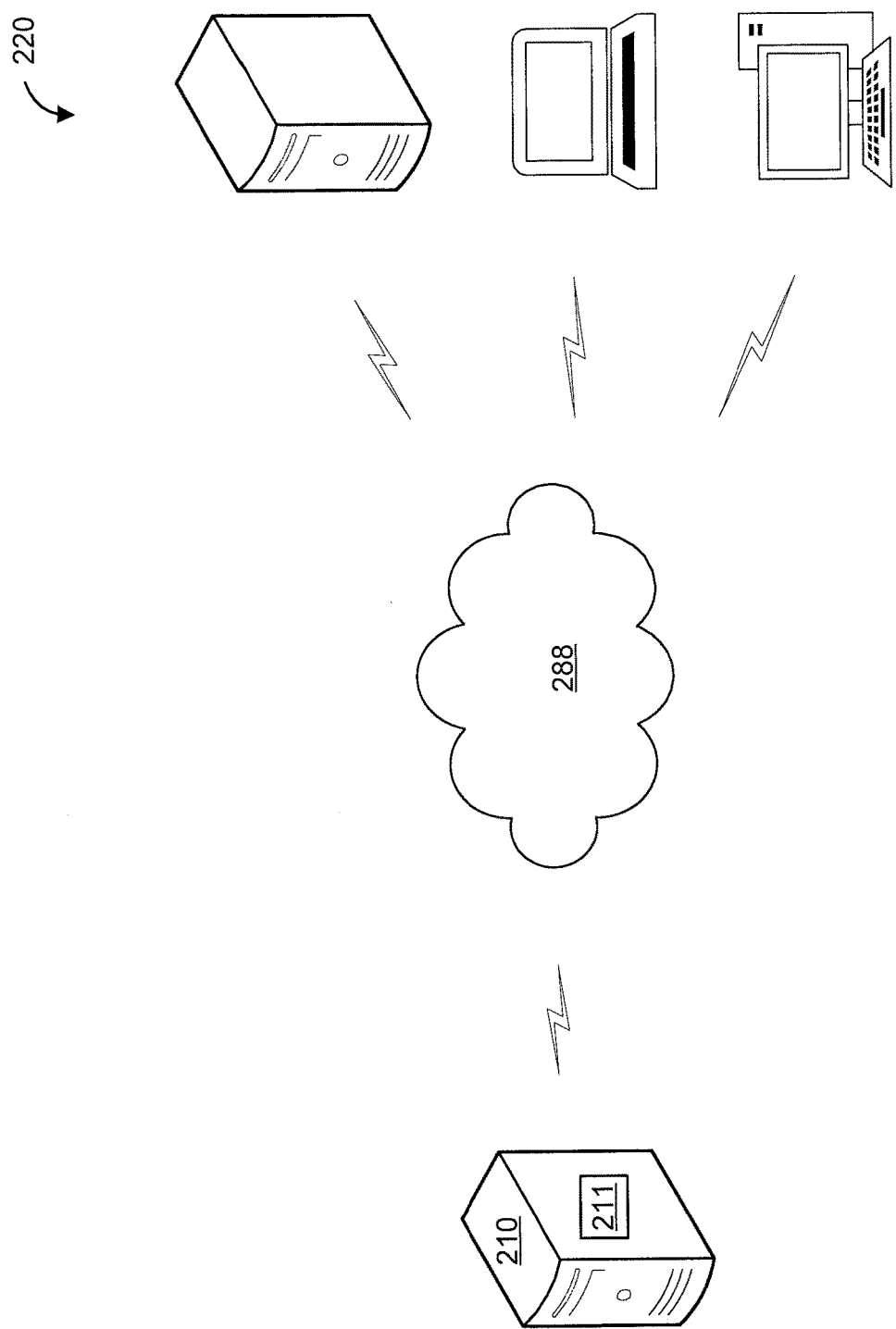
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
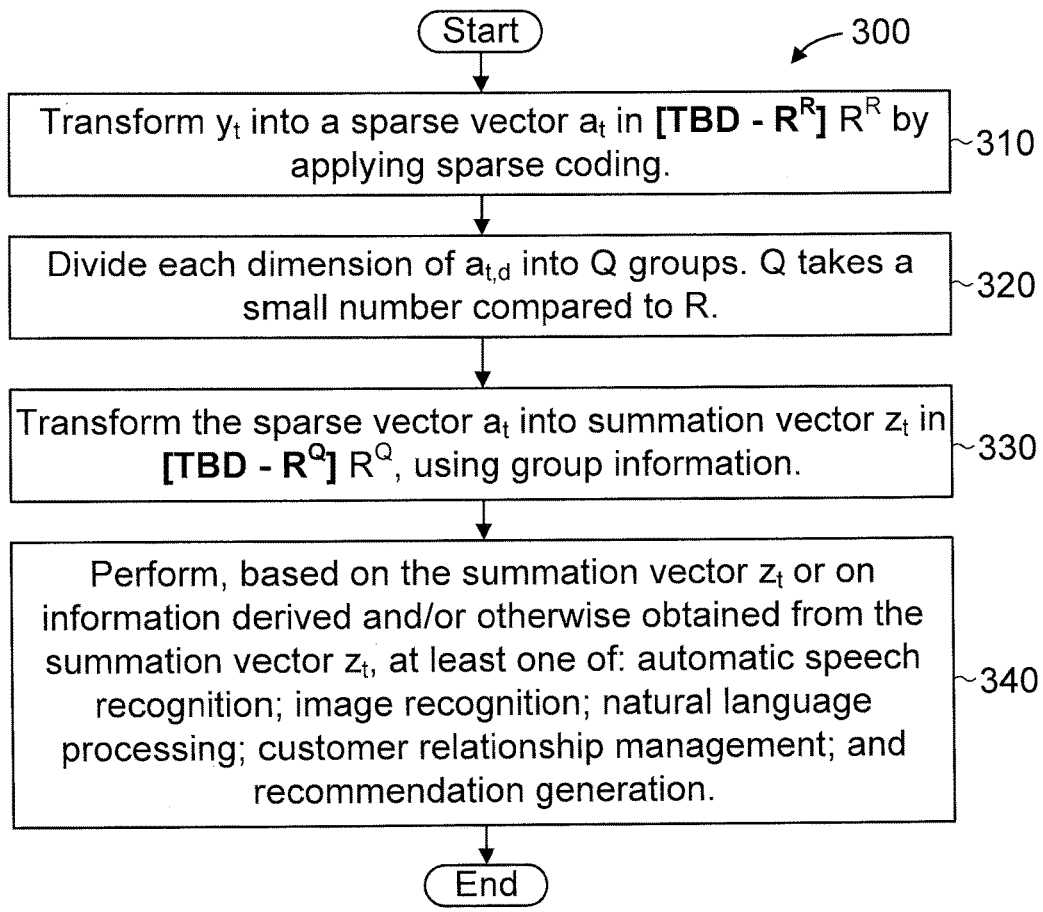
FIG. 3 shows an exemplary method for statistical max pooling with deep learning, in accordance with an embodiment of the present invention.
Figure 5:
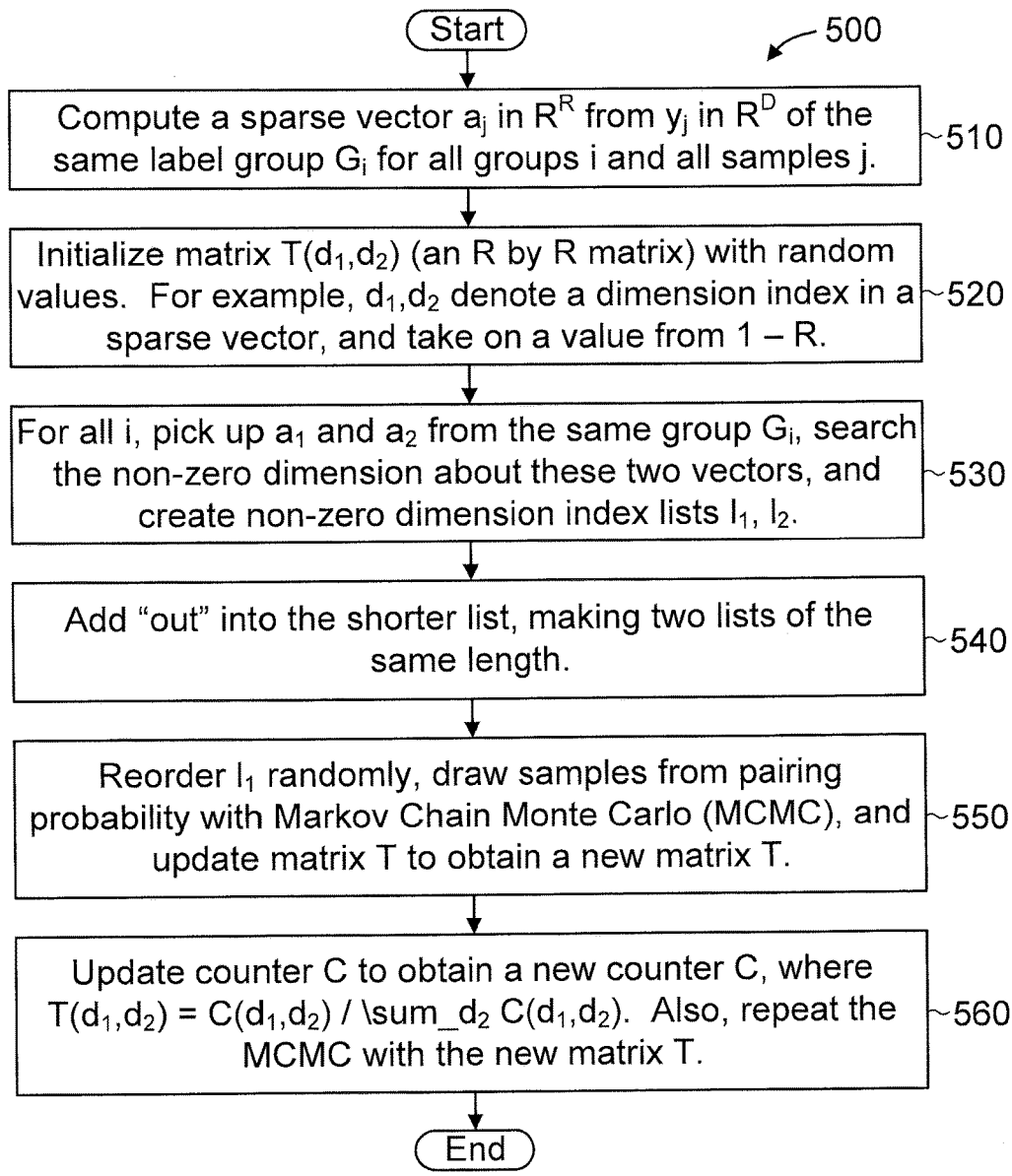
FIG. 5 shows an exemplary method for computing a pairing translate probability, in accordance with an embodiment of the present invention.
Figure 7:
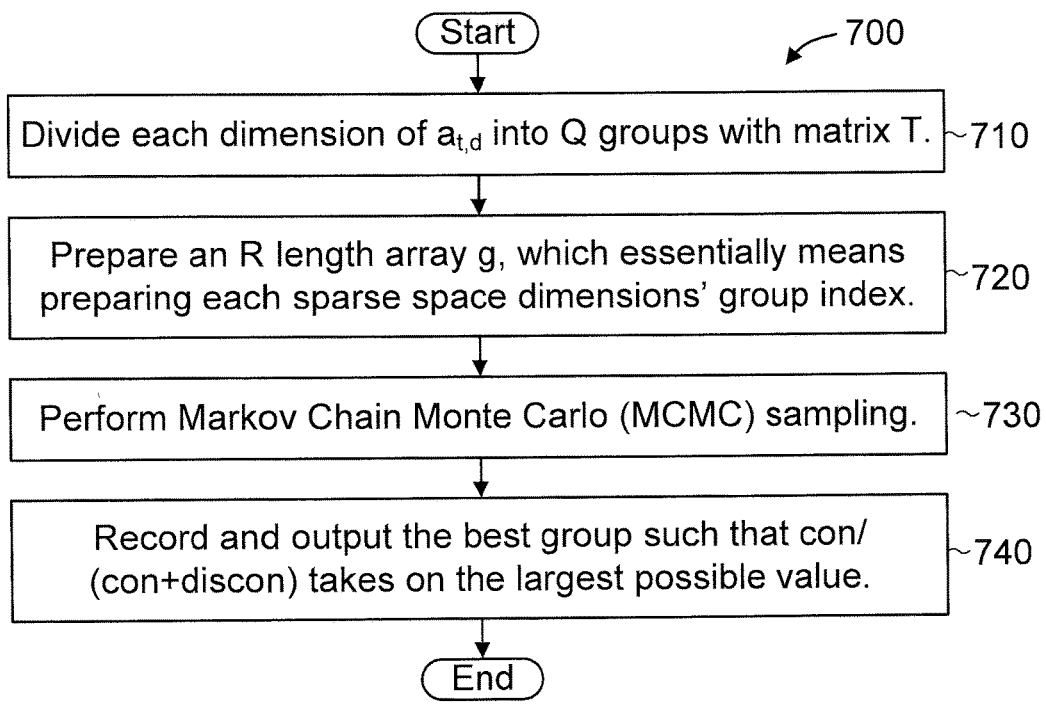
FIG. 7 shows an exemplary grouping method, in accordance with an embodiment of the present invention.

Further, it is to be appreciated that processing system 100 may perform at least part of the method described herein including, for example, at least part of method 300 of FIG. 3 and/or at least part of method 500 of FIG. 5 and/or at least part of method 700 of FIG. 7. Similarly, part or all of environment 200 may be used to perform at least part of method 300 of FIG. 3 and/or at least part of method 500 of FIG. 5 and/or at least part of method 700 of FIG. 7.

FIG. 2 shows an exemplary environment 200 to which the present invention can be applied, in accordance with an embodiment of the present invention.

The environment includes a computing device 210. The environment further includes a set of computing devices collectively and individually denoted by the figure reference numeral 220.

The computing device 210 is configured to implement the present invention, namely to perform statistical maximum (max) pooling with deep learning. The set of computing devices 220 interact with computing device 210 in order to obtain results and so forth relating to the present invention. It is to be appreciated that the computing device 210 and the computing devices in the set 220 can be any type of computing device, including, but not limited to, servers, desktop computers, laptop computers, personal digital assistants, smart phones, tablets, media devices, and so forth. For the sake of illustration, computing device 210 is implemented herein by a server, and is interchangeably referred to as such.

Communications between the computing device 210 and any of the computing devices 220 can occur over one or more networks (collectively denoted by the figure reference numeral 288). The one or more networks 288 can include any type of networks such as, for example, but not limited to, cellular networks, local area networks, wide area networks, personal area networks, wireless networks, wired networks, any combination of the preceding, and so forth. In the embodiment of FIG. 2, the one or more networks 288 are implemented by one or more wireless networks for the sake of illustration.

The computing device 210 can perform any process/application involving statistical max pooling with deep learning. For example, the computing device 210 can perform a search for similar images in a database 211 (for illustration sake, the database 211 is included in computing device 210, however, in other embodiments, the database can be in a different device including, for example, one of computing devices 220).

Thus, given a query image submitted by any of the computing devices 220, the computing device 210 can find, in the database 211, similar images to the query image. Other applications to which the present invention can be applied include, but are not limited to, automatic speech recognition, image recognition, natural language processing, customer relationship management, anomaly detection, recommendation generation, and so forth. It is to be noted that some of the application can be combined. For example, image recognition and anomaly detection can be combined to detect anomalies in systems based on image data. The preceding can be further combed with recommendation generation in order to generate recommendations for addressing (overcoming, eliminating, minimizing, etc.) the anomaly.

In the embodiment shown in FIG. 2, the elements thereof are interconnected by a network(s) 288. However, in other embodiments, other types of connections can also be used. Moreover, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIG. 3 shows an exemplary method 300 for statistical max pooling with deep learning, in accordance with an embodiment of the present invention.

For the sake of illustration regarding method 300, consider the following unsupervised learning example involving side information, to which method 300 is applied.

In the unsupervised learning example, we have an input vector $y_t$ (image) in $R^D$ (where $R^D$ denotes the input vector space of D-dimensions), and group information G, which represents the same label group of $y_t$. It is to be noted that label information itself is not required.

For example, consider the following:
$y=\{y_0, y_1, y_2, y_4, y_5\}$
$G_0=\{y_0, y_3, y_5\}, G_1=\{y_1, y_2\}, G_2=\{y_4\}$ At step 310, transform $y_t$ into a sparse vector at in $R^R$ (where $R^R$ denotes the sparse coding space of R-dimensions) by applying sparse coding.

Further regarding step 310, let us presume that y in $R^D$ is a D-dimensional input vector (e.g., 100×100 pixel size monochrome images as input,) then y is D=10000 dimensional vector. Of course, almost all elements will be non-zero (dense vector), because the input is images. If we have a lot of input vector sets $\{y\}$, we can construct a sparse transformation y=Wa. Here "a" in $R^R$ is an R-dimensional sparse vector (meaning that almost all elements are equal to 0, with only a few elements being nonzero), W is D*R matrix which means the collections of basis image (one column means one basis image) to represent y, and W is the optimal solution. R>>D in general.

In other words, if we have a lot of basis images in W, each image y can be represented with a weighted sum of a small number of basis images from W. Also, the weight (sparse) representing each y is sparse vector a.

A technique to optimize W from $\{y_t\}$ can be as follows:
1. Initialize W with random values.
2. Compute at for each $y_t$ with current W by optimizing following equation with respect to at:

$$\|y_t - Wa_t\|^2 + \Delta|a_t|L1$$

3. Compute W with current $\{y_t\}$ and $\{a_t\}$ by optimizing following equation with respect to W:

$$\sum_t \|y_t - Wa_t\|^2$$

4. Normalize each column vector in W for all i to maintain the following equation:

$$\|w_i\|=1$$

5. Repeat steps 2-4 until convergence.

Referring back to FIG. 3, at step 320, divide each dimension of $a_{t,d}$ into Q groups. Q takes a small number compared to R.

In an embodiment, dividing each dimension per step 320 can involve the following:

For each $a_{t,d}$, where "d" denotes a dimension index, and "t" denotes a sample index), create a non-zero dimensions' list, and create a "Pairing Transition Probability Matrix", such that T(d,d') takes a large value when the same group samples often have (e.g., more than a threshold amount of time) the same non-zero dimensions.

Create Q groups from R dimensions with T such that the internal transition probability become highs.

At step 330, transform the sparse vector at into summation vector $z_t$ in $R^Q$ (where $R^Q$ denotes the summation vector space of Q-dimensions), using group information.

In an embodiment, transforming at per step 330 can involve the following:
Compute the max in $a_{t,d}$ (d in the same group).
Use $z_t$ as an input vector for the next layer of a neural network.

At step 340, perform, based on the summation vector $z_t$ or on information derived and/or otherwise obtained from the summation vector $z_t$, at least one of: automatic speech recognition; image recognition; natural language processing; customer relationship management; and recommendation generation.

Method 300 can consider an image's non-linear appearance changes of same the objects therein, and translate good summation features. A simple comparison of input vector space or sparse vector space cannot do this.

Figure 4:
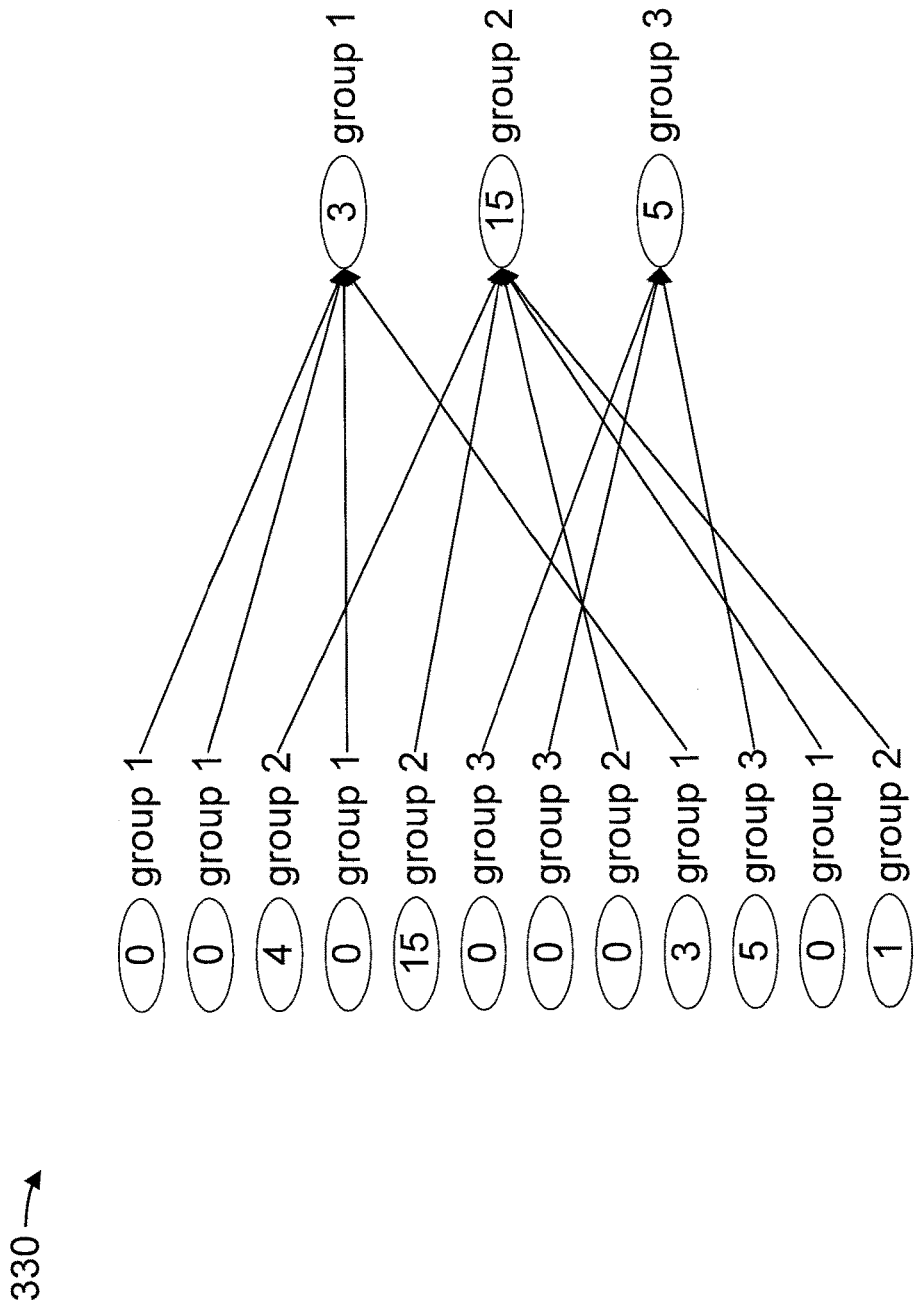
FIG. 4 graphically shows step 330 of the method of FIG. 3, in accordance with an embodiment of the present invention.

FIG. 4 graphically shows step 330 of method 300 of FIG. 3, in accordance with an embodiment of the present invention. The maximum (max) value from {at} which belongs to the same group is output, per step 330.

FIG. 5 shows an exemplary method 500 for computing a pairing translate probability, in accordance with an embodiment of the present invention.

At step 510, compute a sparse vector $a_j$ in $R^R$ from $y_j$ in $R^D$ of the same label group $G_i$ for all groups i and all samples j.

At step 520, initialize matrix $T(d_1,d_2)$ (an R by R matrix) with random values. For example, $d_1,d_2$ denote a dimension index in a sparse vector, and take on a value from 1–R.

At step 530, for all i, pick up $a_1$ and $a_2$ from the same group $G_i$, search the non-zero dimension about these two vectors, and create non-zero dimension index lists $I_1, I_2$.

As an example regarding step 530, when $a_1$, $0^{th}$, $10^{th}$, $20^{th}$ dimensions are non-zero, $a_2$ $1^{st}$, $23^{rd}$, $24^{th}$, $60^{th}$ dimensions are non-zero, and then $l_1<=\{0,10,20\}$, $l_2<=\{1,23,24,60\}$).

At step 540, add "out" into the shorter list, making two lists of the same length. For example, $l_1<=\{0,10,20, \text{out}\}$, $l_2<=\{1,23,24,60\}$. Of course, other placeholders can be used instead of the specific term "out".

At step 550 reorder $l_1$ randomly, draw samples from pairing probability with Markov Chain Monte Carlo (MCMC), and update matrix T to obtain a new matrix T.

In an embodiment, reordering per step 550 can involve the following:
Reorder $l_1$ randomly, compute pairing probability p. Repeat the following:
For example, randomly select 10 and 20 from l1, exchange these. $l_1<=\{0, 20, 10, \text{out}\}$.
For example, compute pairing probability p, where p=T (0,1)*T(20,23)*T(10,24)*T(out,60)
Do MCMC sampling with p, update counter $C(d_1,d_2)$.
For example, C(0,1)++, C(20,23)++, C(10,24)++, C(out, 60)++, if accepted.

At step 560, update counter C to obtain a new counter C, where $T(d_1,d_2)=C(d_1,d_2)/\text{sum\_d}_2 C(d_1,d_2)$. Also, repeat the MCMC with the new matrix T.

Figure 6:
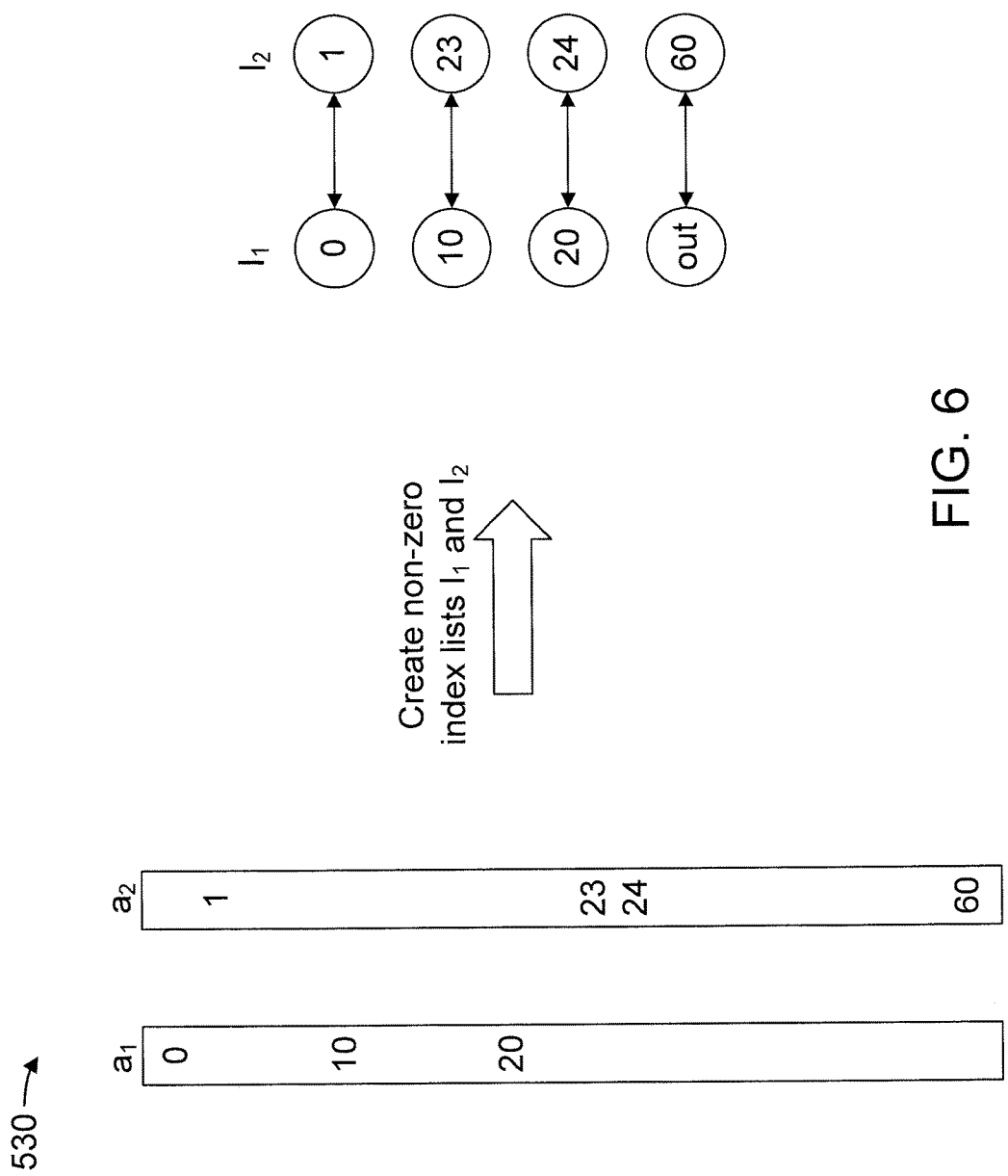
FIG. 6 graphically shows step 530 of the method of FIG. 5, in accordance with an embodiment of the present invention.

FIG. 6 graphically shows step 530 of method 500 of FIG. 5, in accordance with an embodiment of the present invention. Sparse vectors $a_1$ and $a_2$ are picked up from Group $G_i$, as per step 530 of method 500. Moreover, a "non-zero index list" is created from the sparse vectors, as per step 530 of method 500. Also, $I_1$ elements are exchanged, and considered for pairing with 12, as per step 530 of method 500.

FIG. 7 shows an exemplary grouping method 700, in accordance with an embodiment of the present invention.

At step 710, divide each dimension of $a_{t,d}$ into Q groups with matrix T.

At step 720, prepare an R length array g, which essentially means preparing each sparse space dimensions' group index. For example, g={0,0,0,00,1,1,1,1,2,2,2,2, ..., Q−1, Q−1,Q−1,Q−1}.

At step 730, perform Markov Chain Monte Carlo (MCMC) sampling.

In an embodiment, MCMC per step 730 can involve the following:

Randomly select i,j in [1,R], and exchange these.
For example, group={0,0,2,0,1,1,1,1,2,0,2,2, ..., Q−1, Q−1,Q−1,Q−1}

Compute the total sum of within-group transition probability con and between-group transition probability discon, as follows:

con=\sum_$d_1$,$d_2$ in same group) T($d_1$,$d_2$)
discon=\sum_{$d_1$,$d_2$ in different group} T($d_1$,$d_2$)

Perform MCMC sampling with probability {con/(con+discon)}^p p is a hand tuned parameter.

Regarding p (and also λ which is a hand tuned parameter), it/they can be tuned as follows. In a general case, a computed feature vector is used for prediction tasks such as, for example, image recognition, image annotation, hand written digit clustering, and so forth. Parameters such as p are determined such that the following prediction task's result becomes acceptably accurate with a cross-validation framework.

At step 740, record and output the best group such that con/(con+discon) takes on the largest possible value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for image processing, comprising: receiving an image dataset having image data for a plurality of images and a group dataset having group information for each of the plurality of images;
   transforming the image dataset into a sparse vector by applying sparse coding and using the group Information;
   dividing each of dimensions of the sparse vector into multiple groups with a matrix, the matrix being generated such that the matrix takes on a higher value when samples in a same group from among the multiple groups have same non-zero dimensions above a threshold amount of time and takes on a lower value compared to the higher value when the samples in the same group lack the same non-zero dimensions above the threshold amount of time; and
   transforming the sparse vector into a summation vector using the multiple groups.

2. The computer-implemented method of claim 1, wherein the matrix is generated by identifying one or more non-zero dimensions from a pair of sparse vectors in the same group.

3. The computer-implemented method of claim 2, further comprising:
   creating a pair of non-zero dimension index lists from the pair of sparse vectors in the same group;
   randomly reordering at least one of the non-zero dimension index lists; and
   computing a pairing probability between the non-zero dimension index lists subsequent to the reordering.

4. The computer-implemented method of claim 3, wherein the image data comprises data samples, and the method further comprises:
   selecting particular ones of the data samples using the pairing probability; and
   updating the matrix with the particular ones of the data samples.

5. The computer-implemented method of claim 1, further comprising using the summation vector as an input vector for a next layer of a neural network.

6. The computer-implemented method of claim 1, wherein the group information comprises label information.

7. The computer-implemented method of claim 1, further comprising sampling, wherein said sampling step comprises computing a first probability and a second probability, the first probability being a total sum of within-group transition probabilities and the second probability being a between-group transition probability.

8. The computer-implemented method of claim 7, wherein said sampling step obtains samples based on {the first probability/(the first probability+the second probability)}$^p$, wherein p is a hand-tuned parameter.

9. The computer-implemented method of claim 7, wherein said sampling step is performed using a Markov Chain Monto Carlo technique.

10. The computer-implemented method of claim 1, wherein said transforming step comprises extracting and outputting a respective maximum value, from the sparse vector, which belongs to the same group, for at least one of the multiple groups.

11. The computer-implemented method of claim 1, further comprising performing image recognition, based on the summation vector or on information obtained from the summation vector.

12. A computer program product for image processing, the computer program product comprising a non-transitory computer readable storage medium having program instructions embodied therewith, the program instructions executable by a computer to cause the computer to perform a method comprising:

receiving an image dataset having image data for a plurality of images and a group dataset having group information for each of the plurality of images;

transforming the image dataset into a sparse vector by applying sparse coding and using the group information;

dividing each of dimensions of the sparse vector into multiple groups with a matrix, the matrix being generated such that the matrix takes on a higher value when samples in a same group from among the multiple groups have same non-zero dimensions above a threshold amount of time and takes on a lower value compared to the higher value when the samples in the same group lack the same non-zero dimensions above the threshold amount of time; and transforming the sparse vector into a summation vector using the multiple groups.

13. The computer program product of claim 12, wherein the matrix is generated by identifying one or more non-zero dimensions from a pair of sparse vectors in the same group.

14. The computer program product of claim 13, wherein the method further comprises:

creating a pair of non-zero dimension index lists from the pair of sparse vectors in the same group;

randomly reordering at least one of the non-zero dimension index lists; and computing a pairing probability between the non-zero dimension index lists subsequent to the reordering.

15. The computer program product of claim 14, wherein the image data comprises data samples, and the method further comprises:

selecting particular ones of the data samples using the pairing probability; and updating the matrix with the particular ones of the data samples.

16. The computer program product of claim 12, further comprising sampling, wherein said sampling step comprises computing a first probability and a second probability, the first probability being a total sum of within-group transition probabilities and the second probability being a between-group transition probability.

17. The computer program product of claim 16, wherein said sampling step obtains samples based on {the first probability/(the first probability+the second probability)}$^p$, wherein p is a hand-tuned parameter.

18. The computer program product of claim 12, further comprising performing image recognition, based on the summation vector or on information obtained from the summation vector.

19. A computing device, the computing device comprising:

a processor and a memory operably coupled to the processor, configured to:

receive an image dataset having image data for a plurality of images and a group dataset having group information for each of the plurality of images; transform the image dataset into a sparse vector by applying sparse coding and using the group information; divide each of dimensions of the sparse vector into multiple groups with a matrix, the matrix being generated such that the matrix takes on a higher value when samples in a same group from among the multiple groups have same nonzero dimensions above a threshold amount of time and takes on a lower value compared to the higher value when the samples in the same group lack the same non-zero dimensions above the threshold amount of time; and transform the sparse vector into a summation vector using the multiple groups.

20. The computing device of claim 19, wherein said processor and memory are further configured to perform image recognition, based on the summation vector or on information obtained from the summation vector.

* * * * *